United States Patent
Najmolhoda et al.

(10) Patent No.: US 6,581,634 B2
(45) Date of Patent: Jun. 24, 2003

(54) SOLENOID CONTROL VALVE WITH PARTICLE GETTERING MAGNET

(75) Inventors: Hamid Najmolhoda, Grand Rapids, MI (US); David L. Seid, Conklin, MI (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 0 days.

(21) Appl. No.: 10/035,916

(22) Filed: Oct. 22, 2001

(65) Prior Publication Data

US 2002/0162594 A1 Nov. 7, 2002

Related U.S. Application Data

(63) Continuation-in-part of application No. 09/480,196, filed on Jan. 10, 2000, now Pat. No. 6,321,767.

(51) Int. Cl.[7] .............................................. F15B 13/044
(52) U.S. Cl. ................. 137/545; 137/544; 137/596.17; 137/596.2; 137/625.65
(58) Field of Search ................. 137/544, 545, 137/596.17, 596.2, 625.65

(56) References Cited

U.S. PATENT DOCUMENTS

| | | | |
|---|---|---|---|
| 3,656,076 A | 4/1972 | Prouty et al. | 335/240 |
| 3,884,417 A | 5/1975 | Sheffield et al. | 239/102 |
| 4,150,925 A | 4/1979 | Perkins | 417/418 |
| 4,347,812 A | 9/1982 | Kosuda et al. | 123/90.55 |
| 4,522,163 A | 6/1985 | Hooper | 123/73 F |
| 4,615,307 A | 10/1986 | Kodama et al. | 123/90.16 |
| 4,617,306 A | 10/1986 | Welzel et al. | 514/288 |
| 4,631,923 A | 12/1986 | Smith | 60/530 |
| 4,696,265 A | 9/1987 | Nohira | 123/90.16 |
| 4,789,208 A | 12/1988 | Kohno | 303/115 |
| 4,839,041 A * | 6/1989 | Kuwayama et al. | 184/6.25 |
| 4,860,794 A | 8/1989 | Parrott et al. | 137/637.2 |
| 4,911,405 A | 3/1990 | Weissgerber | 251/129.14 |
| 4,938,545 A | 7/1990 | Shuey et al. | 303/119 |
| 4,988,074 A | 1/1991 | Najmolhoda | 251/129.08 |
| 5,421,366 A | 6/1995 | Naffziger et al. | 137/614.2 |
| 5,456,581 A | 10/1995 | Jokela et al. | 417/282 |
| 5,467,797 A | 11/1995 | Seetharaman et al. | |
| 5,549,274 A | 8/1996 | Buchanan et al. | 251/129.14 |
| 5,605,317 A | 2/1997 | Mealy et al. | 251/129.01 |
| 5,611,370 A | 3/1997 | Najmolhoda | 137/625.61 |
| 5,647,318 A | 7/1997 | Feucht et al. | 123/322 |
| 5,673,658 A | 10/1997 | Allmendinger | 123/90.12 |
| 5,687,765 A | 11/1997 | You | 137/627.5 |
| 5,738,142 A | 4/1998 | Eike et al. | 137/596.17 |
| 5,765,515 A | 6/1998 | Letsche | 123/90.12 |
| 5,809,950 A | 9/1998 | Letsche et al. | 123/90.12 |
| 5,845,667 A | 12/1998 | Najmolhoda et al. | 137/1 |
| 5,915,348 A | 6/1999 | Scheidt et al. | 123/90.17 |
| 5,921,526 A | 7/1999 | Najmolhoda | 251/65 |
| 5,984,259 A | 11/1999 | Najmolhoda et al. | 251/50 |
| 5,996,628 A | 12/1999 | Najmolhoda et al. | 137/625.61 |
| 6,019,120 A | 2/2000 | Najmolhoda et al. | 137/82 |
| 6,209,563 B1 | 4/2001 | Seid et al. | 137/15.21 |
| 6,321,767 B1 | 11/2001 | Seid et al. | 137/15.21 |

* cited by examiner

Primary Examiner—Gerald A. Michalsky

(57) ABSTRACT

Engine oil solenoid control valve having a solenoid coil, a solenoid armature movable by energization of a solenoid coil, a check valve communicated to a fluid exhaust port of the control valve, a fluid control valve movable relative to a fluid control port in response to armature movement, and a permanent magnet disposed relative to one or more fluid supply ports of the control valve to magnetically attract and hold or getter ferrous particles in hydraulic fluid supplied to the supply port(s).

12 Claims, 2 Drawing Sheets

US 6,581,634 B2

SOLENOID CONTROL VALVE WITH PARTICLE GETTERING MAGNET

This application is a continuation-in-part of U.S. Ser. No. 09/480,196 filed Jan. 10, 2000, now U.S. Pat. No. 6,321,767.

FIELD OF THE INVENTION

The present invention relates to a solenoid control valve and a control method.

BACKGROUND OF THE INVENTION

Internal combustion engines for motor vehicles are known which include a hydraulic system for performing work in addition to lubrication. This work can be used to activate/deactivate cylinders of an internal combustion engine to conserve fuel. Such a hydraulic valve lifter activation/deactivation system can include a hydraulic control valve in a valve housing mechanically connected to a separate solenoid. The solenoid includes a solenoid coil bobbin on which a wire coil is wound and an armature that moves the control valve in response to an input signal (coil electrical current signal) to the wire coil to control hydraulic pressure in the valve lifter oil control gallery. A separate check valve assembly is mounted in a fluid exhaust passage (vent-to-sump) in the engine block or cylinder head and functions to maintain oil pressure in the oil control gallery at a preselected minimum value. Such engine oil control solenoids comprise numerous components which must be assembled together and are known to suffer from hydraulic fluid (oil) leakage through various paths around the solenoid housing.

The Seid and Najmolhoda U.S. Pat. No. 6,209,563 describes a solenoid control valve having a molded one-piece valve nozzle and coil bobbin member that includes an integral check-valve receiving receptacle communicated to an exhaust port.

Copending application Ser. No. 09/480,196, now U.S. Pat. No. 6,321,767, also describes a solenoid control valve. A coil bobbin region and check valve-receiving receptacle are formed on a molded one-piece member. A nozzle or port-forming member having a spool valve therein is received in an open end of the one-piece member.

Engine oil solenoid control valves are communicated to the valve lifter oil control gallery (i.e. receive supply pressure) such that ferrous (paramagnetic) particles in the engine oil supply may migrate or pass through the supply port filters of the control valve to the solenoid air gap where they can adversely affect performance and life of the control valve by restricting spool stroke.

An object of the present invention is to provide an improved a hydraulic fluid solenoid control valve that traps or getters ferrous particles in the hydraulic fluid supplied to one or more supply port(s) of the control valve.

SUMMARY OF THE INVENTION

The present invention provides a hydraulic fluid solenoid control valve, such as in one embodiment, an engine oil solenoid control valve, having a solenoid coil, a solenoid armature movable by energization of a solenoid coil, a check valve communicated to a fluid exhaust port of the control valve, a fluid control valve movable relative to a fluid control port in response to armature movement, and a permanent magnet disposed relative to one or more fluid supply ports of the control valve to magnetically capture or getter ferrous particles in hydraulic fluid supplied to the supply port(s).

In an illustrative embodiment of the invention, the solenoid control valve includes a molded one-piece member that defines a check valve-receiving receptacle and a coil bobbin region of the solenoid. The molded one-piece member includes an end proximate the check valve-receiving receptacle that receives a fluid port-forming and spool-receiving sleeve member that provides the fluid supply port and fluid control port. A spool valve is received in the port-forming sleeve member and includes a spool valve end connected to the armature of the solenoid. The spool valve moves in response to movement of the solenoid armature in response to electrical current signals supplied to the solenoid coil. The spool valve includes first and second lands that are moved relative to the respective fluid supply port and control port to control fluid flow at the control port.

The sleeve member includes the ferrous particle-capturing permanent magnet on an end of the sleeve member that is received in a fluid supply bore of an internal combustion engine block or cylinder head to remove ferrous particles from the hydraulic fluid. The permanent magnet is disposed on the sleeve member in the supply bore at a location upstream of the supply port. The permanent magnet can have a disc or annular ring configuration and be fastened on the end of the sleeve member by adhesive, press fit, crimping, and other suitable fastening technique. The permanent magnet can comprise any suitable permanent magnet material to magnetically attract and hold ferrous particles in the hydraulic fluid before the particles can enter the fluid control valve.

The foregoing and other objects, features, and advantages of the invention will become apparent from the following more detailed description taken with the accompanying following drawings.

DESCRIPTION OF THE INVENTION

The present invention can be practiced with respect to engine oil solenoid fluid control valves of the general types described in the Background Of The Invention hereof used on internal combustion engines of motor vehicles to control a hydraulic valve lifter activation/deactivation system to activate/deactivate engine cylinders. The invention is not so limited and can be used to control engine cooling as well as other engine systems. For purposes of illustration only and not limitation, the present invention will be described herebelow with respect to an engine oil solenoid fluid control valve of the type described in allowed copending application Ser. No. 09/480,196, now U.S. Pat. No. 6,321,767, of common assignee herewith, the teachings of which are incorporated herein by reference.

Figure 1:
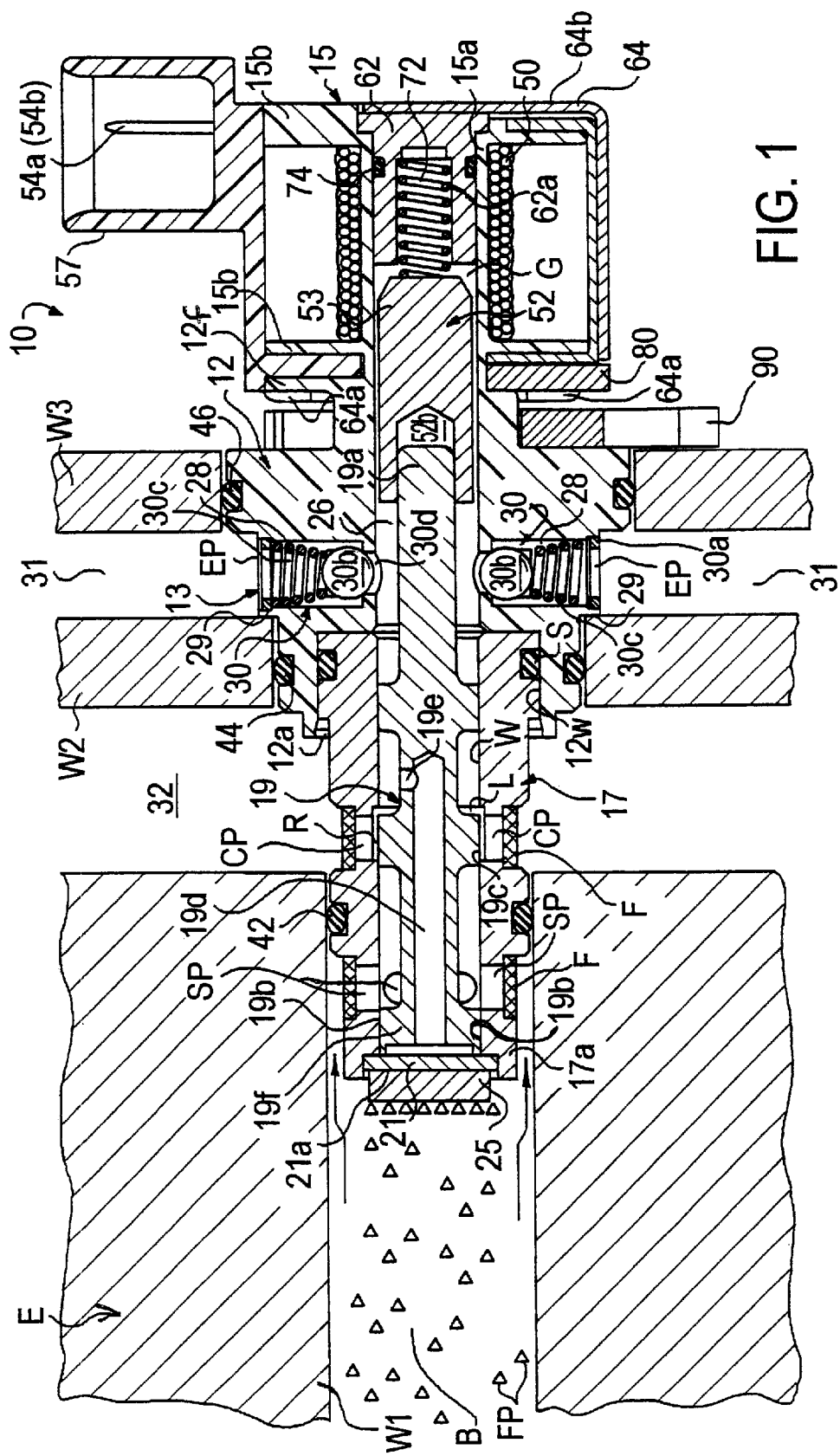
FIG. 1 is a longitudinal sectional view of an engine oil solenoid actuated control valve pursuant to an embodiment of the invention showing a disc-shaped permanent magnet on an end of the spool-receiving sleeve member.

Referring to FIG. 1, an engine oil solenoid control valve 10 pursuant to an illustrative embodiment of the invention is shown including a molded one-piece check valve nozzle and bobbin member 12 forming a check valve-receiving region 13 and a coil bobbin region 15. The member 12 can be injection or otherwise molded of a moldable thermoplastic material, such as the high temperature rated, glass fiber reinforced thermoplastic material (e.g. A model A1133HS material available from Amoco Polymers, Inc.), or other suitable moldable material.

The molded one-piece member 12 includes an open end 12a proximate the check valve-receiving region 13 that receives a tubular fluid port-forming and spool-receiving metal (e.g. aluminum) sleeve member 17 that provides a plurality of supply ports SP and control ports CP on the sleeve member 17. A fluid seal S is provided between the sleeve member 17 and the inner wall 12w of the open end 12a. The outermost end of the sleeve member 17 is sealed closed by a brass (or other material) plug or plate 21 that also acts a spool stop. A spool valve 19 is received in a cylindrical axial bore of port-forming sleeve member 17 and includes a spool valve end 19a connected to a solenoid armature 52. The spool valve 19 moves in response to movement of the solenoid armature 52 in response to electrical current signals supplied to the solenoid coil 50. The spool valve 19 includes first and second cylindrical sealing surfaces or lands 19b, 19c that are moved relative to the respective fluid supply ports SP and control ports CP to control fluid flow at the control ports. The spool valve 19 may include additional lands (not shown) to prevent binding of the spool valve 19 in the axial bore of sleeve member 17. Annular fluid filters F can be provided in annular grooves on the sleeve member 17 for the supply ports SP and control ports CP. The control ports CP are communicated to one another by an annular recessed control port chamber or region R extending circumferentially about the inner wall W of the sleeve member 17 and relative to which the spool land 19c moves to open or close the control port chamber or region R as described below.

The supply ports SP are communicated to a source of hydraulic fluid pressure, such as a main engine oil pressure supply bore B in an internal combustion engine block or cylinder head E. In particular, the end 17a of the sleeve member 17 is received in the bore B so that the supply ports SP receive hydraulic oil via the bore B. An O-ring seal 42 is disposed on the end of the sleeve member 17 to seal on wall W1 defining the bore B.

Pursuant to an embodiment of the invention, a permanent magnet 25 is disposed on the end of the sleeve member 17 that is received in the oil pressure supply bore B provided in the internal combustion engine block or cylinder head E. For example, the permanent magnet 25 is disposed on the axial end surface 21a of plate 21 on sleeve member 17 in the supply bore B at a location upstream of the supply port(s) SP so that the permanent magnet can magnetically attract and hold or getter ferrous particles in the hydraulic fluid before the particles can enter the fluid control valve.

Figure 2:
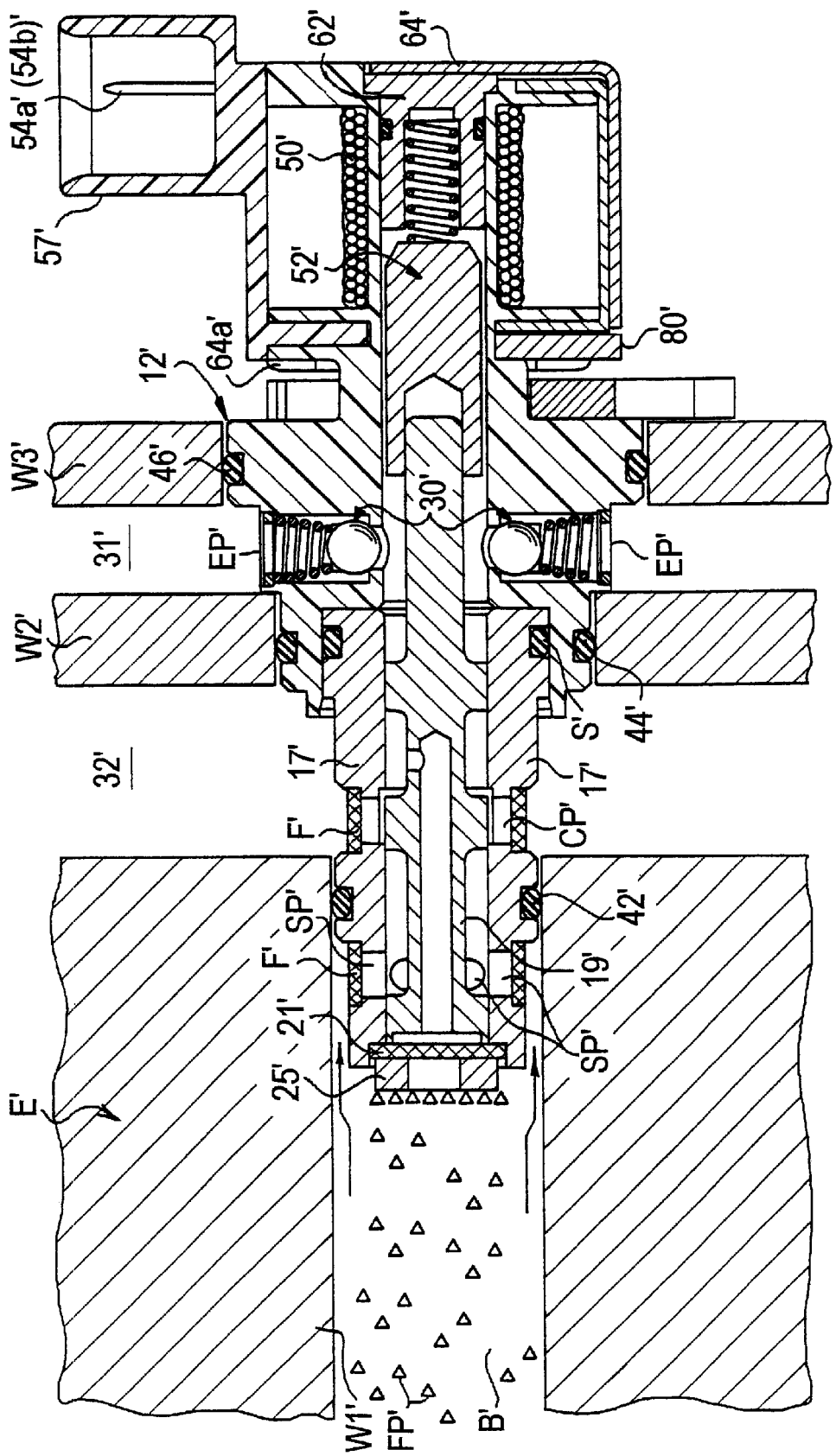
FIG. 2 is a similar longitudinal sectional view of the engine oil solenoid actuated control valve pursuant to another embodiment of the invention showing an annular ring shaped permanent magnet on an end of the spool-receiving sleeve member.

The permanent magnet can have a circular disc configuration as shown in FIG. 1, an annular ring configuration 25' as shown in FIG. 2, or any other configuration. In FIG. 2, like reference numerals primed are used for like features of FIG. 1.

The permanent magnet 25 can be fastened on the axial end surface 21a of plate 21 by epoxy adhesive, press fit, crimping, and other suitable fastening technique. The permanent magnet 25 can comprise any suitable permanent magnet material such as, for example, preferably a rare earth element-bearing permanent magnet material such as $Nd_2Fe_{14}B$ permanent magnet material.

The permanent magnet 25 functions to magnetically attract and trap, hold or capture certain ferrous particles FP present in the hydraulic fluid, removing the particles from the fluid, before the particles can be carried to annular filter F disposed on end 17a at the supply ports SP through which they might migrate to the solenoid air gap G where they can adversely affect performance and life of the control valve by restricting the stroke of spool valve 19. The permanent magnet 25 typically is provided to attract and capture ferrous particles in a size range of about 5 to 75 microns for a major particle dimension to remove them from the hydrualic fluid, while the filter F at supply ports SP is designed to trap or capture to this same end larger ferrous particles in the size range of greater than 75 microns for a major particle dimension. The ferrous particles typically originate from wear or abrasion of ferrous (e.g. iron or iron alloy) engine components.

The control ports CP are communicated to a control passage 32 that supplies hydraulic fluid to an oil control gallery (not shown) of a hydraulic valve lifter activation/deactivation circuit provided in the engine block or engine cylinder head E.

A longitudinal armature bore or passage 26 is defined in part in the region 13 and communicates to a pair of diametrically opposed check valves 30 residing in a respective receptacle 28 formed in intermediate diameter bosses 29 on one-piece member 12. Each receptacle 28 defines an exhaust port EP. Passage 26 communicates to the axial bore of sleeve member 17. Each check valve 30 includes an annular cap 30a held in the receptacle 28 by heat staking or ultrasonic welding and a ball check valve 30b made of steel (e.g. type 440C steel) and located between a biasing spring 30c and ball valve seat 30d. Ball valve seat 30d can be formed integral to member 12 by molding or comprise a separate insert in the nozzle region. Each check valve 30 communicates to an exhaust passage 31 of the hydraulic valve lifter activation/deactivation circuit. The check valves 30 are provided at the respective exhaust port EP to prevent oil pressure in the oil control gallery (not shown) of the hydraulic valve lifter activation/deactivation circuit from falling below a preselected minimum oil pressure value such as, for example only 3 psi, when the hydraulic valve lifter activation/deactivation system is deactivated.

The spool valve 19 includes a longitudinal bore or passage 19d that communicates at one end to a radial bore 19e that in turn communicates to the axial bore of sleeve member 17 and armature bore 26. At the other opposite end 19f of the spool valve, the passage 19d communicates to any hydraulic fluid that leaks from the supply port SP past land 19b so as to fluid pressure balance the spool valve 19.

The region 13 and sleeve member 17 include respective first and second O-ring seals 44, 42 that are disposed in a circumferential groove molded integrally in the member 12 and a circumferential groove formed in sleeve member 17. Seals 44, 42 mate with walls W2, W1 of fluid control passage 32 of a hydraulic valve lifter activation/deactivation circuit provided in the engine block or engine cylinder head E with the control passage 32 supplying hydraulic fluid to the oil control gallery. A third O-ring seal 46 is provided in a circumferential groove molded integrally on larger diameter region 13 of member 12 and together with O-ring 44 mate with walls W3, W2 of fluid exhaust passage 31 of a hydraulic valve lifter activation/deactivation circuit provided in the engine block or engine cylinder head with fluid exhaust passage 31 providing for return of hydraulic fluid to a low pressure sump. As mentioned above, check valves 30 are provided at the exhaust ports EP to prevent oil pressure in the oil control gallery of the hydraulic valve lifter activation/deactivation circuit from falling below a preselected minimum oil pressure value such as, for example only, 3 psi, when the valve lifter activation/deactivation system is deactivated.

In particular, at the closed spool valve position of FIG. 1, the control land 19c does not completely close off the region R of control ports CP such that there is a preselected underlap (gap) L of the land 19c at region R of control ports CP (e.g. 0.003 inch gap) controlled by bias of armature spring 72 and effective to provide a 3 psi hydraulic pressure at control ports CP and at check valve 30 in armature bore 26 in the closed spool valve position when the valve lifter activation/deactivation system is deactivated. The underlap L communicates the control ports CP and armature bore 26 to supply port SP enough to provide the 3 psi fluid (oil) pressure at control ports CP and check valves 30. The underlap L is controlled by bias of armature spring 72. As an example of the 3 psi underlap, if there is 20 psi hydraulic pressure at the supply port SP, a 3 psi hydraulic pressure can be provided by underlap L at the control ports CP and check valves 30, which opens, as necessary, to allow fluid flow through exhaust ports EP to maintain 3 psi in the oil control gallery that is communicated to control ports CP. The check valves 30 thus open against bias of respective springs 30c as necessary to maintain a 3 psi (or other) oil pressure at the control ports and the oil control gallery when the valve lifter activation/deactivation system is deactivated.

The coil bobbin region 15 includes an electromagnetic wire coil 50 (partially shown) wound on bobbin sleeve 15a along the length thereof between annular bobbin end walls 15b. The coil 50 is connected to a source of input signals, such as an engine electronic control (EEC) module (not shown), that provides electrical current signals to the coil 50 to control movement of an armature 52 that, in turn, controls the position of a spool valve 19 between the closed/open valve positions (on/off) to control hydraulic pressure in the valve lifter oil control gallery. The solenoid coil 50 receives the current signals via electrical connectors 54a, 54b that reside in a molded connector housing 57 disposed on member 12 and that are connected to the coil. The connectors 54a, 54b are connected to the signal source (EEC module).

The spool valve 19 is moved between the valve closed position, FIG. 1, and a valve open position in response to electrical current signals supplied to solenoid coil 50 from the EEC module (not shown). The spool valve 19 is moved to the open position to activate the hydraulic valve lifter activation/deactivation system (not shown) and to the valve closed position to deactivate the hydraulic valve lifter activation/deactivation system as described in allowed copending application Ser. No. 09/480,196, now U.S. Pat. No. 6,321,767, of common assignee herewith, the teachings of which are incorporated herein by reference.

A simple generally cylindrical armature rod 53 can be used as the armature 52 in an embodiment of the present invention that further includes molded integral arcuate recesses (not shown) in bore 26. Such arcuate recesses extend radially into the armature bore 26 on diametrically opposite sides of the bore 26 and along the axis of bore 26 to provide axial paths for hydraulic fluid on opposite lateral ends of the armature 52 to eliminate any imbalanced hydraulic pressures acting thereon (hydraulic lock condition where the armature would remain in open or closed positions) as shown and described in copending application Ser. No. 09/480,196, now U.S. Pat. No. 6,321,767, and U.S. Pat. No. 6,209,563 of assignee herewith, the teachings of which are incorporated herein by reference. The armature rod 53 typically is made of ferrous material such as steel. A simple, low cost armature rod 53 can be used without the need for a complex geometry armature.

The armature 52 includes an axial end bore 52b in which the end 19a of the spool valve 19 is pressed in interference fit to a preselected axial dimension dictated by the depth of bore 52b. This controlled dimension of the spool valve end in the armature bore 52b permits close control of the axial gap G provided between ferromagnetic armature 52 and a ferromagnetic (e.g. steel) pole piece 62 without the need for a calibration of the axial gap. The pole piece 62 is disposed in an end bore of the coil bobbin region 15 by radially compressive forces of O-ring 74 disposed on the pole piece.

A fast response, high flow rate control valve is provided by preselected gap G provided between the end of the armature 52 and pole piece 62 in the bobbin region 15 together with annular circumferentially recessed control port chamber or region R. The preselected gap G in turn defines a spool valve open position relative to the control port chamber or region R where, at the open valve position, a flow area is provided to control ports CP equal to the circumference of the annular recessed control port chamber or region R multiplied times the gap axial distance by which the spool land 19c opens at the control port chamber or region R as a result of the armature end closing the gap G when the appropriate electrical current signals are supplied to the solenoid coil 50 as described in allowed copending application Ser. No. 09/480,196 now U.S. Pat. No. 6,321,767, of common assignee herewith, the teachings of which are incorporated herein by reference.

The solenoid can or housing 64 typically is made of steel or other magnetically permeable material and includes an axial end flange 64b to axially retain the pole piece 62. The solenoid housing 64 is joined to the member 12 by circumferential or radial tabs 64a crimped to overlie a partial annular flange 12f of the one-piece member 12 and the steel flux washer 80.

Steel flux washer 80 is disposed on the member 12 in a position to concentrate magnetic flux at the armature 52 residing in the armature bore 26. The washer 80 extends about approximately 85% of the periphery of the armature 52.

The pole piece 62 is provided with a controlled axial dimension blind bore 62a that receives the end of the spring 72 to avoid the need to calibrate the spring preload using a set screw.

The engine oil solenoid control valve having the ferrous particle-trapping permanent magnet 25 on the sleeve member 17 pursuant to the invention can be used to control oil pressure in the oil control gallery of an internal combustion engine as part of a hydraulic valve lifter activation/deactivation system. A mounting bracket 90 is provided to mount the solenoid control valve on the engine block to this end. The invention is not limited to practice with the engine oil solenoid control valve described in detail above and can be practiced with the engine oil solenoid control valve described in U.S. Pat. No. 6,209,563 having a ball valve, rather than a spool valve, and already incorporated herein by reference as well as other types of engine oil solenoid control valves.

Although certain preferred embodiments of the invention have been shown and described in detail, it should be understood that variations or modifications may be made without departing from the spirit or scope of the present invention.

We claim:

1. A hydraulic fluid solenoid control valve, comprising a solenoid coil, a solenoid armature movable by energization of said solenoid coil, a check valve communicated to a fluid exhaust port of said solenoid control valve, a fluid control valve movable relative to a fluid control port of said solenoid control valve in response to armature movement, and a permanent magnet disposed on said solenoid control valve to capture ferrous particles present in hydraulic fluid supplied to a fluid supply port of said solenoid control valve.

2. The solenoid control valve of claim 1 wherein said permanent magnet is disposed on said solenoid control valve upstream of said supply port.

3. The solenoid control valve of claim 2 wherein said permanent magnet is disposed on a supply port-forming region of said solenoid control valve.

4. The solenoid control valve of claim 1 wherein said permanent magnet comprises a rare earth-bearing permanent magnet.

5. A hydraulic fluid solenoid control valve, comprising a one-piece member forming a solenoid coil bobbin region and an integral check valve-receiving region having a check valve-receiving receptacle communicated to a fluid exhaust port, a solenoid armature, a fluid control valve movable relative to a fluid control port in response to armature movement, a check valve disposed in said receptacle, a solenoid coil on the coil bobbin region for receiving electrical signals to control armature movement, and a permanent magnet disposed on said solenoid control valve to capture ferrous particles present in hydraulic fluid supplied to a fluid supply port of said solenoid control valve.

6. The solenoid control valve of claim 5 wherein said one piece member includes an end proximate the check valve-receiving region that receives a fluid port-forming sleeve member that provides the supply port and the control port, said permanent magnet being disposed on said port-forming sleeve member.

7. The solenoid control valve of claim 6 wherein said permanent magnet is disposed on an axial end surface of the port-forming sleeve member.

8. The solenoid control valve of claim 7 wherein said permanent magnet has a disc configuration.

9. The solenoid control valve of claim 7 wherein said permanent magnet has a ring configuration.

10. The solenoid control valve of claim 6 wherein said control valve comprises a spool valve received in the port-forming sleeve member.

11. The combination of a hydraulic pressure supply bore of an internal combustion engine and a hydraulic fluid solenoid control valve, said solenoid control valve comprising a fluid supply port communicated to said bore, a solenoid coil, a solenoid armature movable by energization of said solenoid coil, a check valve communicated to a fluid exhaust port of said solenoid control valve, a fluid control valve movable relative to a fluid control port of said solenoid control valve in response to armature movement, and a permanent magnet disposed on said solenoid control valve upstream of said fluid supply port to capture ferrous particles present in hydraulic fluid supplied via said bore to said fluid supply port.

12. The combination of claim 11 wherein said valve includes a sleeve member having said fluid supply port thereon received in said bore, said permanent magnet being disposed on said sleeve member in said bore at a location upstream of said supply port.

* * * * *

UNITED STATES PATENT AND TRADEMARK OFFICE
CERTIFICATE OF CORRECTION

PATENT NO. : 6,581,634 B2
DATED : June 24, 2003
INVENTOR(S) : Hamid Najmolhoda et al.

It is certified that error appears in the above-identified patent and that said Letters Patent is hereby corrected as shown below:

Column 7,
Line 28, after "one" insert -- - --.

Signed and Sealed this

Twenty-eighth Day of October, 2003

JAMES E. ROGAN
*Director of the United States Patent and Trademark Office*